Aug. 8, 1950  H. W. CARDWELL ET AL  2,517,973
FRICTION BRAKE
Filed Dec. 18, 1946  3 Sheets-Sheet 3

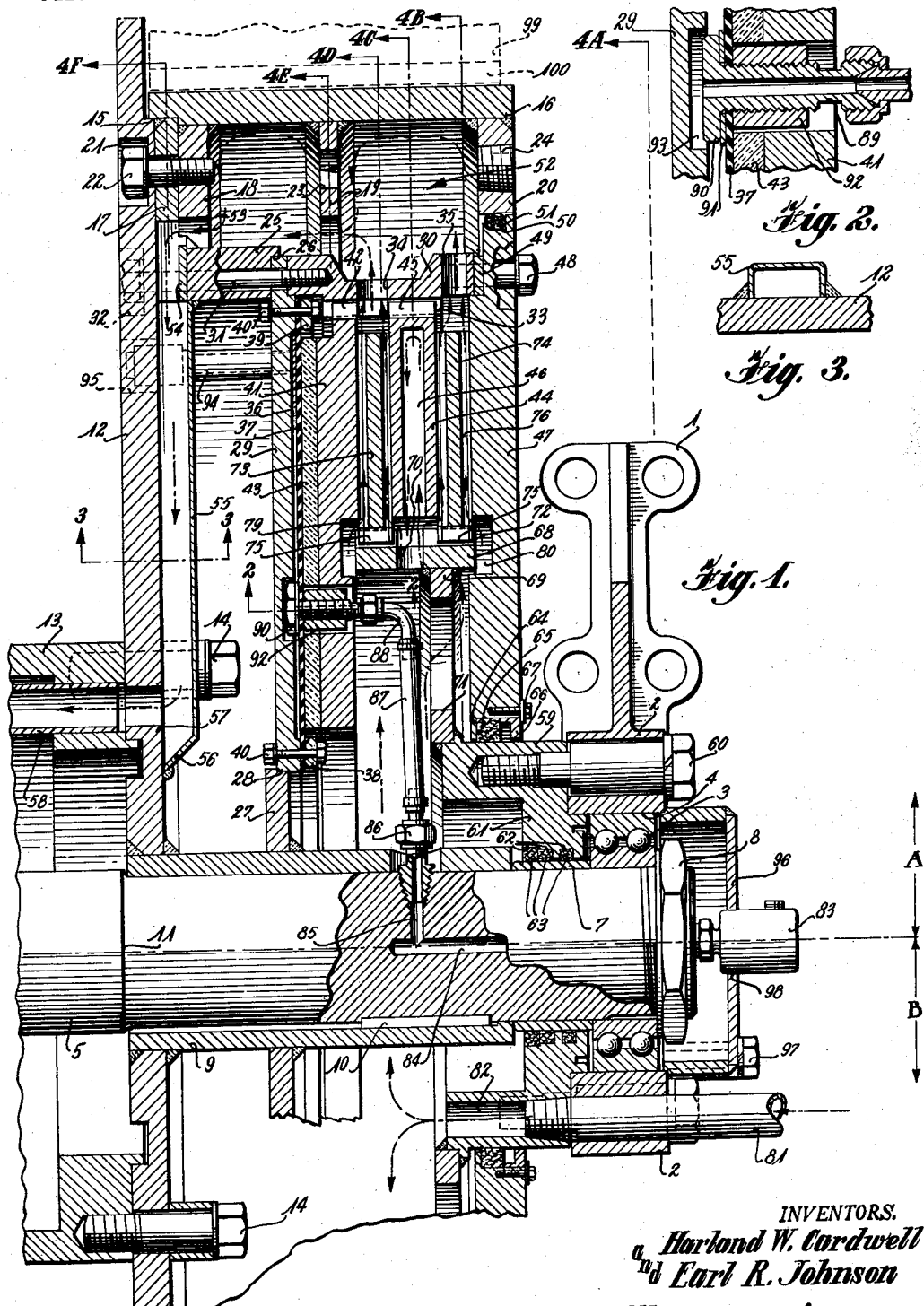

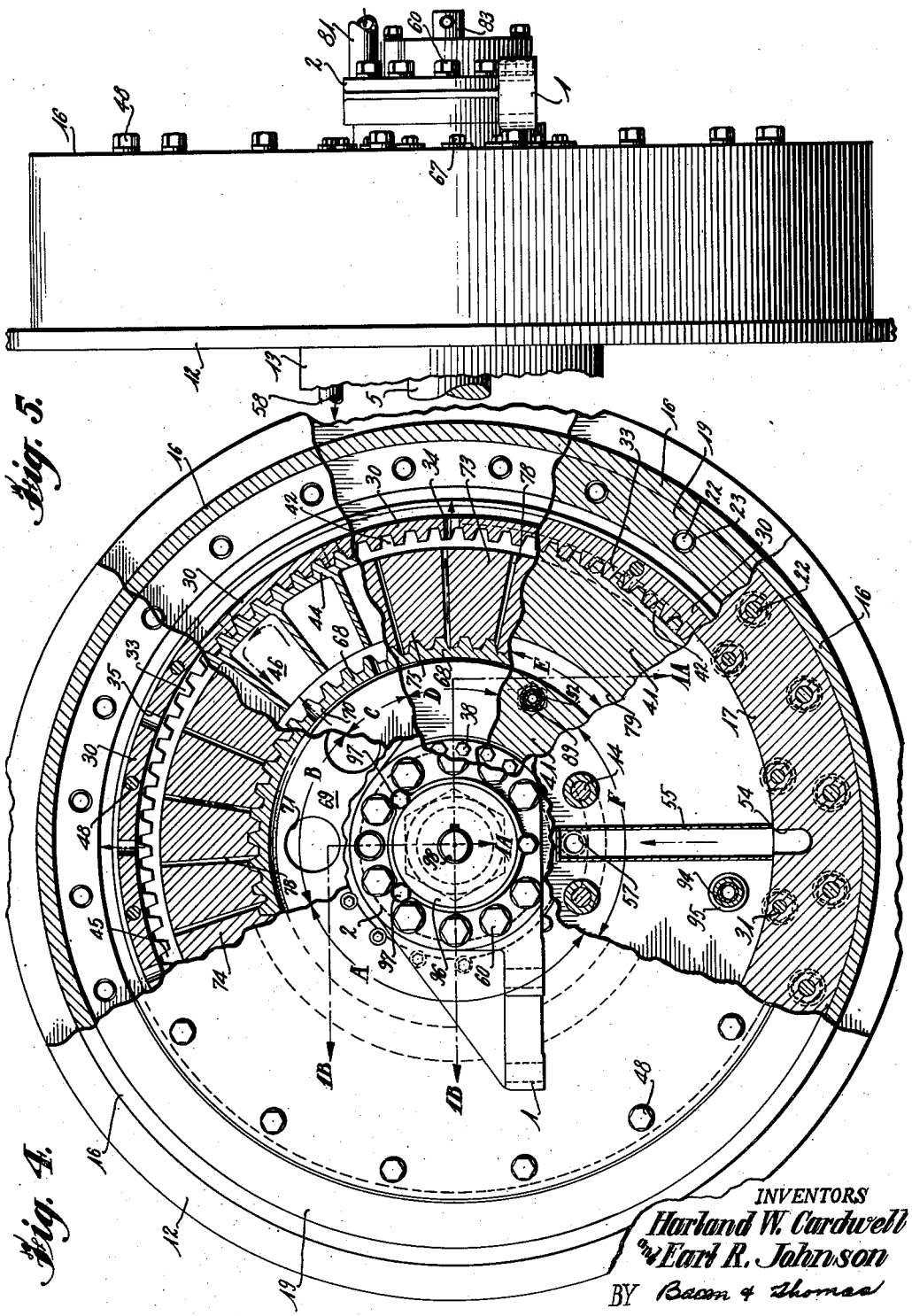

INVENTORS.
Harland W. Cardwell
and Earl R. Johnson
BY Bacon & Thomas
ATTORNEYS.

Patented Aug. 8, 1950

2,517,973

UNITED STATES PATENT OFFICE 2,517,973

FRICTION BRAKE

Harland W. Cardwell and Earl R. Johnson, Wichita, Kans., assignors to Cardwell Manufacturing Company, Inc., Wichita, Kans.

Application December 18, 1946, Serial No. 716,916

14 Claims. (Cl. 188—71)

This invention relates to friction brakes and particularly to a pneumatically operated brake of the disk type adapted to control large loads.

One of the objects of this invention is to provide a brake of the type referred to that is compact in construction, efficient in operation, and provided with means for dissipating heat developed by friction between the parts incident to operation.

A further object of this invention is to provide, in a pneumatically operated brake, means to prevent conduction of frictionally generated heat from the operating parts to the pneumatic means.

A still further object of this invention is to provide a brake structure in which certain parts thereof may be adjusted to compensate for wear between the friction elements.

Figure 6:
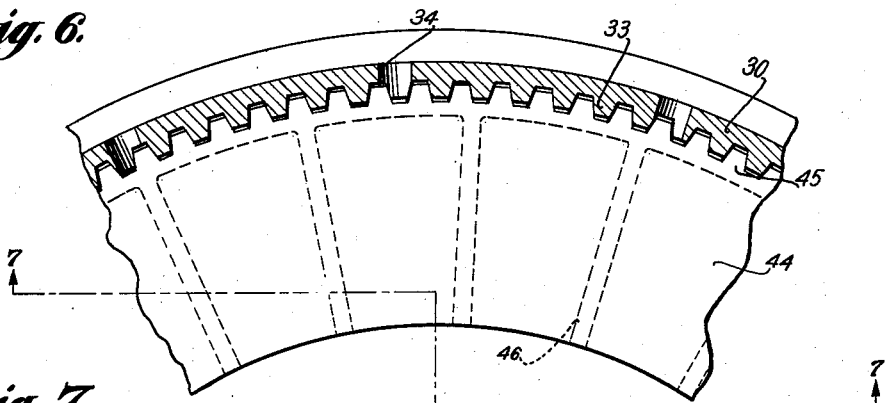
Figure 7:
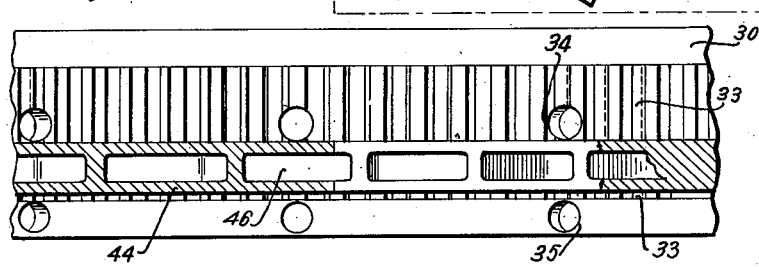
Figure 8:
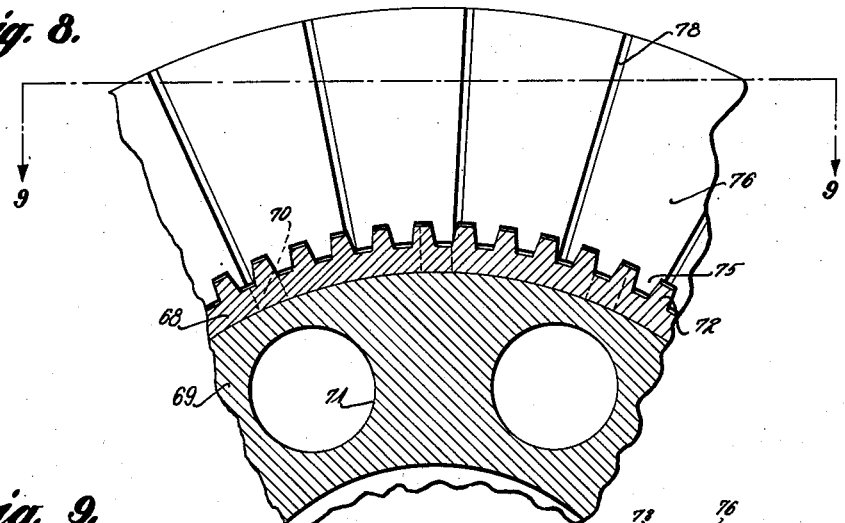
Figure 9:
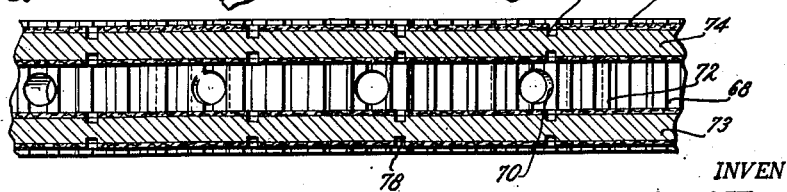

An illustrative embodiment of the invention is shown in the accompanying drawings in which:

Figure 1 is a longitudinal sectional view with certain parts thereof being shown in elevation, the portion above the center line of the shaft being taken on line IA—IA of Figure 4 and the portion below said center line being taken on the line IB—IB of Figure 4, Figure 2 is a detailed sectional view taken on the line 2—2 of Figure 1, Figure 3 is a detailed sectional view taken on line 3—3 of Figure 1, Figure 4 is a composite sectional view of which the sectors identified as A, B, C, D, E, and F are portions of sectional views taken on lines 4A, 4B, 4C, 4D, 4E, and 4F, respectively, of Figure 1, Figure 5 is an edge elevational view of the complete brake structure, Figure 6 is a detailed sectional view taken in a plane adjacent a hollow rotary brake element, Figure 7 is a sectional view taken on line 7—7 of Figure 6, Figure 8 is a detailed sectional view taken in a radial plane adjacent one face of the right-hand stator member, and Figure 9 is a sectional view taken on line 9—9 of Figure 8.

Referring to Figures 1 and 4 of the drawings, there is shown a bracket member 1 adapted to be attached by bolts or equivalent means to a stationary supporting frame (not shown). The bracket member 1 is formed integrally with a circular bearing case 2 which supports a bearing assembly 3. The outer race of the bearing assembly is carried in an opening 4 of the bearing case. The inner race of the bearing assembly supports and is mounted on a supporting shaft 5. The shaft 5 has pressed thereon a sealing ring 7 of polished copper, or the like, against which the inner race is held by a nut 8 screwed on to the outer end of the shaft 5.

A tubular support 9 is also keyed to the shaft 5, by means of a key 10, and extends from the sealing ring 7 to a shoulder 11 formed on the shaft. This tubular support fits the shaft sufficiently tight to prevent the passage of cooling fluid therebetween. The tubular support 9 has attached thereto, such as by welding, a disk member 12. In the embodiment illustrated, disk 12 constitutes one end member of a drum or reel structure on which the load to be controlled is carried. A cylindrical member 13 is carried by disk member 12, concentric to the axis of shaft 5, and attached thereto by such means as cap screws 14. The cylindrical member 13 constitutes the body or base member of the load-carrying drum.

Disk member 12 is formed, adjacent to its outer periphery, with a rabbet providing a shoulder 15 which shoulder forms a seat for a cylindrical member 16. The cylindrical member 16 has attached to its inner periphery a plurality of inwardly extending annulus members 18, 19, and 20, all of which are attached to the cylindrical member 16 as by welding. Member 17 is welded to the disc 12 to provide additional bearing for the cap screws 22, which are countersunk nearly through the disc 12, as described below. Member 18 is provided with a plurality of threaded openings in alignment with openings in the member 17. The disk member 12 is provided with recesses 21 in which are located the heads of cap screws 22, the said cap screws extending through the openings in member 17 and threaded into the threaded openings in member 18 to thereby hold the cylinder 16 and its attached annulus members in assembled relation to disk member 12. It is to be noted that the shoulder 15 acts to locate cylinder 16 concentric to the axis of the drum 13 and shaft 5, and also acts, due to a snug fit between the parts, to seal the space inside the cylinder 16 against leakage of a coolant medium. Annulus member 19 is provided with a plurality of openings 23 therethrough to provide free circulation of the coolant medium. Annulus member 20 is provided with an opening that is normally closed by a plug member 24. This opening and plug member are provided to enable the inclosed space within the cylinder 16 to be drained of the coolant medium whenever necessary or desired.

Another cylindrical member 25 is attached to the face of disk member 12 in abutting and liquid-sealing relationship thereto. The cylindrical member 25 is also arranged concentric to the cylindrical member 16 and shaft 5 and is provided at its outer end with a rabbet 26, for a purpose to be described later. Radially inwardly of rabbet 26 a circular flange member 27 is attached to the tubular support 9, such as by welding, and is provided on its outer periphery with a rabbet 28.

An annular disk-shaped reaction plate 29 is mounted with its inner and outer peripheral portions seated in liquid-sealing relation in the rabbets 26 and 28 of members 25 and 27, respectively. An additional cylindrical member 30 of approximately the same diameter as the cylindrical member 25 is arranged in abutting and liquid-sealing engagement with the reaction plate 29 and is clamped thereto by a plurality of cap screws 31. These cap screws 31 have their heads lying in recesses 32 of disk member 12 and extend through aligned openings in disk member 12, cylindrical member 25 and reaction plate 29 into threaded engagement with the cylindrical member 30, whereby tightening of the cap screws 31 effects a rigid assembly in which the joints between the elements are liquid tight.

The inner peripheral surface of the cylindrical member 30 is provided with a plurality of inwardly extending tooth portions 33 lying parallel to the axis of the shaft 5. Cylindrical member 30 is also provided with a series of openings 34 and 35 extending radially through its inner and outer surfaces.

The reaction plate 29, described above, is provided in one face thereof with an annular recess 36 extending concentrically about the tubular support 9 and the shaft 5. Overlying the recess 36 is an annular non-metallic flexible diaphragm 37, of rubber or the like. The diaphragm 37 is held in sealing engagement with the face of the reaction plate 29, adjacent the inner and outer edges of the recess 36, by means of clamping rings 38 and 39 and bolt assemblies 40, thus converting the recess 36 into an air tight expansible pressure chamber.

An annular pressure plate 41 is provided at its outer periphery with outwardly extending tooth elements 42 complementary to and interengaging with the inwardly extending tooth elements 33 of the cylindrical member 30. The pressure plate 41 is thus supported by the cylindrical member 30 for sliding movement axially of the brake structure but is held against rotation relative to the cylindrical member 30. An annular plate of heat insulating material 43 is attached to the face of the pressure plate 41, nearest to the diaphragm 37, by any suitable means, such as by an adhesive. The insulating plate 43 is of radial extent less than the radial extent of the recess or pressure chamber 36, whereby it may be moved to a position inwardly of the recess by virtue of its engagement with the outer face of the diaphragm 37, as clearly shown in Figure 1 of the drawings. The insulating member 43 is provided to prevent the conduction of frictionally generated heat from the pressure plate 41 to the diaphragm 37, thus protecting the diaphragm from the deteriorating effects of high temperatures and prolonging its useful life.

An intermediate plate 44, also of annular shape, is likewise provided with outwardly extending tooth elements 45 complementary to and interengaging with tooth elements 33, whereby intermediate plate 44 is also supported for sliding movement axially of the brake structure and held against rotation relative to member 30. The intermediate plate 44 is further provided with a plurality of recesses 46 extending through the inner periphery of the plate 44 and terminating inwardly of the bases of tooth elements 45, thus providing a circumferential series of coolant-receiving pockets.

To the outer or free end of cylindrical member 30 an annular backing plate 47 is attached by means of cap screws 48. Spacing washers 49 are provided between the backing plate 47 and the cylindrical member 30. These washers are provided so that upon wear of the friction surface of the brake elements they may be replaced by thinner washers or removed altogether to accomplish adjustment compensating for the above-mentioned wear. The outer periphery of the backing plate 47 is formed with a seat 50 for a packing ring 51, which provides a liquid seal between backing plate 47 and annular member 20. It will be clear that the structure so far described provides a peripheral coolant chamber 52.

Annular member 18 is provided with an opening 53 in alignment with the outer end of a radial passageway 54 in member 17. The disk member 12 has fastened to its face, such as by welding, a channel member 55 (see Figure 3) having one end closed as at 56 and the other end abutting the inner periphery of member 17, thus providing a fluid-tight passageway radially of the disk 12 with said passageway communicating, through passageway 54 and opening 53, with the coolant chamber 52. An opening 57 extends through disk 12 and communicates with the interior of the passageway formed by the channel member 55. A tubular conduit 58 is mounted in the drum member 13 in alignment with opening 57, thus providing a passageway for exhaust of the coolant medium from the chamber 52. The coolant is led by conduit 58 to a position at the opposite end of drum 13 (not shown).

Referring back to bracket 1 and bearing case 2, a cylindrical reaction spindle 59 is attached to the inner face of the bearing case 2 by means of such cap screws as shown at 60 and concentric to the shaft 5. A radially inwardly extending flange portion 61 of the reaction spindle 59 is provided on its inner periphery with a plurality of seats 62 in which fluid-seal rings 63, of felt or the like, are held. The seal rings 63 bear against the seal ring 7 carried by the shaft 5, thus effecting a liquid-tight seal between the shaft 5 and the coolant chamber. The backing plate 57 is likewise provided with a seat 64 for a packing ring 65, of felt or the like, which bears against the outer periphery of a cylindrical portion of the reaction spindle 59, thus providing a liquid-tight seal between the stationary reaction spindle and the backing plate 47. A retaining ring 66 and cap screws 67 lock the packing ring 65 in position on its seat.

A stator assembly consisting of cylindrical portion 68 and radial flange 69 is attached, as by welding, to the inner end of the outer peripheral portion of the reaction spindle 59. Cylindrical portion 68 and flange 69 are likewise joined together, as by welding, to provide a rigid stationary structure. The cylindrical portion 68 is provided with a plurality of radial openings 70 and the radial flange 69 is provided with a series of openings 71, which openings facilitate the flow of coolant liquid through the brake. The outer peripheral surface of the cylindrical portion 68 is provided with outwardly extending tooth elements 72 arranged parallel to the axis of the shaft 5. Each of a pair of similar stator plates 73 and 74, which are annular in shape, is provided at its inner periphery with inwardly extending tooth elements 75 complementary to and interengaging with the outwardly extending tooth elements of member 68. The stator plates 73 and 74 are located between the pressure plates 41 and 44 and between the intermediate plate 44 and the backing plate 47, respectively, as shown in Figure 1. The stator plates 73 and 74 are thus mounted for free longitudinal sliding movement on member 68 and are held against rotation relative to said member. Each of the stator plates 73 and 74 is provided on each face thereof with a friction material 76 attached thereto in any convenient manner, and grooves 78 (see Figures 8 and 9) extend radially of each stator plate along each face thereof. The grooves 78 extend completely through the friction facing and into the body of each stator plate, thus providing radial passageways for coolant fluid from the inner portion of the brake structure to the outer peripheral chamber even when the frictionally engaging elements of the brake are in contact with each other and the friction material substantially all worn away. It is to be noted that the pressure plate 41 and the backing plate 47 are provided with facing annular grooves 79 and 80, respectively, adjacent the ends of the cylindrical member 68, thus insuring an unobstructed passage for the coolant fluid around the ends of member 68 even when the plates 41 and 47 are moved toward each other to brake-applying position.

Coolant fluid is introduced into the interior of the brake through a pipe 81 extending through the stationary bearing case 2 and threaded into the reaction spindle 59 in alignment with an inlet passageway 82 extending therethrough as shown.

To move the stationary and moving friction elements of the brake into braking engagement with each other, it is necessary to introduce a fluid medium, under pressure, into the expansible pressure chamber 36. This is accomplished by introducing a compressed fluid, such as compressed air, into a fitting 83 (of a well-known type) attached to the end of the shaft 5 and communicating with an axial bore 84 in said shaft. The compressed fluid is then conducted from the bore 84 through passageway 85, standard fitting 86, flexible conduit 87, and fitting 88 to the interior of expansible pressure chamber 36. The fitting 88 is attached to the flexible diaphragm 37 by means of the assembly shown in section in Figure 2 and consisting of a threaded tubular member 89 extending through aligned openings in the diaphragm 37, the insulating plate 43, and the pressure plate 41 and is clamped to the diaphragm by means of a head 90, washer 91, and a plastic clamp nut 92. The plastic clamp nut 92 performs the dual function of clamping member 89 to the diaphragm and preventing frictionally generated heat in the plate 41 from reaching the tubular member 89 and being conducted thereby to the flexible diaphragm 37. Reaction plate 29 is provided with a recess 93 adjacent head 90 to allow for movement of the head 90 and the diaphragm 37 toward and from the reaction plate 29. Although the use of compressed air is preferred, it is to be understood that other pressure mediums, such as hydraulic fluid, could be employed satisfactorily.

Attached to the reaction plate 29 and communicating with the interior of the pressure chamber 36 is a drain pipe 94 having its capped outer end lying in an opening 95 in the disk 12. This drain pipe is provided for the purpose of draining off any of the coolant liquid that might inadvertently find its way into the pressure chamber.

A cap assembly 96 is attached to the bearing case 2 by means of three cap screws 97 and is provided with an opening 98 to accommodate the fitting 83. The cap 96 protects the bearing assembly 3 from grit and other undesirable materials and also protects the exposed end of shaft 5, its threads and nut 8.

The cylindrical member 16 presents an outer peripheral surface concentric to the axis of shaft 5 and this outer peripheral surface may be employed as an additional braking surface in the event a greater braking torque is needed than can be provided by the structure previously described. A brake shoe 99 with a facing of friction material 100, as shown in dotted lines at the top of Figure 1, may be employed for such purpose. The outer chamber 52 provides also for cooling of the cylindrical member 16 when the latter is employed as an auxiliary brake drum.

In operation, assuming the drum 13 to be rotated by a heavy load, the operator will manipulate a suitable valve (not shown) to introduce compressed air into fitting 83 from whence it is conducted by the conduits described into the interior of the expansible chamber 36, thus moving the diaphragm 37, insulating plate 43, and the pressure plate 41 to the right, as viewed in Figure 1. Upon moving to the right, the pressure plate 41 will frictionally engage stator plate 73 moving it to the right and into engagement with the intermediate plate 44 and it in turn will be moved to the right to engage stator plate 74 and move it to the right into frictional engagement with the backing plate 47, thus introducing frictional resistance to the rotation of the rotor plates 41 and 44 and backing plate 47. Since the plates 41 and 44 are non-rotatable relative to the cylindrical member 30, which in turn is rigid with the disk 12 and drum 13, the actuation of the brake as described will result in providing frictional resistance to continued rotation of the drum 13. The reaction to this resistance is carried back by the stator parts to the bracket member 1 and is absorbed by the framework which supports the mechanism. During all this time, a coolant liquid is flowing through pipe 81 and passageway 82 into the space between the plates 41 and 47 and flows radially outwardly, as shown by the dotted line arrows of Figure 1, to effect cooling of the friction elements and then outwardly through openings 34 and 35 into the outer coolant chamber 52 whence it circulates to the discharge opening 53 and passageway 55 to the conduit 58 previously described. So long as compressed air is supplied to the pressure chamber, the friction elements will be pressed into engagement with each other. Upon release of the compressed air from the chamber 36, the flexible diaphragm 37 will return to a collapsed position, aided by the pressure of the coolant fluid, thus disengaging the friction elements of the brake. It will be noted that in the event the friction facings 76 of the stator plates 73 and 74 become entirely worn away, circulation of the coolant along the paths shown continues because the grooves 78 extend completely through the friction facings and into the material of the stator plates themselves. A portion of the coolant will also enter the recesses 46 in the intermediate plate 44, absorbing heat therefrom and rising in temperature. At such higher temperature the coolant within the recesses acquires a lower density and the cooler liquid near the inner peripheral edge of plate 44, being of greater density, will, by centrifugal force, flow into the recesses displacing the warm coolant therein. It will be noted that upon introduction of compressed air into the pressure chamber 36 the air conducting fitting 88 will have to move relative to the fitting 86 on the shaft 5. Such relative movement is made possible by the provision of the flexible portion 87.

Although the drawings show an assembly employing one intermediate plate 44 and two stator plates, 73 and 74, it is to be understood that the number of such plates employed is not critical. The invention could, with equal facility, be incorporated in a brake having a greater or less number of stator and intermediate plates than shown in the drawings.

It is to be understood that although a specific embodiment has been illustrated and described herein, many changes and modifications may be made in the construction and arrangement of the parts without departing from the invention as defined by the annexed claims.

We claim:

1. A brake comprising a stator member and a rotor member, one of said members being movable into and out of frictional engagement with the other member, means providing an expansible pressure chamber having one wall thereof constituted by a flexible diaphragm, a member of heat insulating material carried by said movable member and engaging said flexible diaphragm, whereby expansion of said pressure chamber will move said movable member into frictional engagement with said other member, and means for conducting a fluid under pressure into said expansible pressure chamber, said fluid conducting means comprising a tubular member extending through and attached to said flexible diaphragm and also extending through aligned openings in said insulating member and said movable member and being surrounded by heat insulating material within said aligned openings.

2. A brake comprising a stator member and a rotor member, one of said members having an element movable into frictional engagement with the other member, said one member having means providing an expansible pressure chamber having one wall thereof movable and engaging said movable element, whereby to move said element into frictional engagement with said other member, means fixed relative to said one member and providing a passageway for fluid under pressure and a flexible conduit communicating at one end with said passageway and having its other end carried by said movable wall and communicating with the interior of said chamber, whereby to conduct fluid under pressure into said chamber.

3. A friction device comprising a shaft, first and second members coaxial therewith, one of said members being in the form of a hollow cylinder fixed to said shaft and the other member having a cylindrical portion extending concentrically through one end wall of said hollow cylinder, an axially movable friction element inside said hollow cylinder and carried by said cylindrical portion of said other member and adjacent said one end wall of said hollow cylinder, and means for moving said friction element into frictional engagement with said one end wall, whereby to introduce a frictional resistance to relative rotation between said members.

4. A brake comprising a shaft, a stator member and a rotor member coaxial therewith, one of said members being in the form of a hollow cylinder fixed to said shaft and the other member having a cylindrical portion extending concentrically through one end wall of said hollow cylinder, an axially movable friction element inside said hollow cylinder and carried by said cylindrical portion of said other member and adjacent said one end wall of said hollow cylinder, means for moving said friction element into frictional engagement with said one end wall, whereby to introduce a frictional resistance to relative rotation between said stator member and said rotor member, and means for axially adjusting said one end wall to compensate for wear of said friction element.

5. A brake comprising a stator member and a rotor member coaxial therewith, one of said members being in the form of a hollow cylinder having an axially adjustable end wall and the other member having a cylindrical portion extending concentrically through said adjustable end wall of said hollow cylinder, an axially movable friction element inside said hollow cylinder and carried by said cylindrical portion of said other member and adjacent said adjustable end wall of said hollow cylinder, means for moving said friction element into frictional engagement with said adjustable end wall, whereby to introduce a frictional resistance to relative rotation between said stator member and said rotor member, said other member being in liquid-sealing engagement with said adjustable end wall of said hollow cylinder, and means for conducting a cooling liquid into said hollow cylinder and about said friction element.

6. A brake comprising a shaft, a stator member and a rotor member coaxial therewith, one of said members being in the form of a hollow cylinder fixed to said shaft and the other member having a cylindrical portion extending concentrically through one end wall of said hollow cylinder, an axially movable friction element inside said hollow cylinder and carried by said cylindrical portion of said other member and adjacent said one end wall of said hollow cylinder, means for moving said friction element into frictional engagement with said one end wall, whereby to introduce a frictional resistance to relative rotation between said stator member and said rotor member, said other member being in liquid-sealing engagement with said hollow cylinder, and means for conducting a cooling liquid into said hollow cylinder and about said friction element.

7. A brake comprising a stationary member and a rotary member, one of said members being in the form of a hollow cylinder having its axis coincident with the axis of rotation of said rotary member, the other of said members having a cylindrical portion coaxial with and extending through one end wall of said hollow cylinder in liquid-sealing engagement therewith, a cylindrical partition in said hollow cylinder dividing the interior thereof into inner and outer concentric chambers, axially slidable friction elements carried by said partition and by the cylindrical portion of said other member within said inner chamber, said friction elements being slidable into frictional engagement with each other, and means conducting a coolant into said inner chamber, outwardly past said friction elements, and through said partition into said outer chamber.

8. A brake comprising a stationary member and a rotary member, one of said members being in the form of a hollow cylinder having its axis coincident with the axis of rotation of said rotary member, the other of said members having a cylindrical portion coaxial with and extending through one end wall of said hollow cylinder in liquid-sealing engagement therewith, a cylindrical partition in said hollow cylinder dividing the interior thereof into inner and outer concentric chambers, axially slidable friction elements carried by said partition and by the cylindrical portion of said other member within said inner chamber, said friction elements being slidable into frictional engagement with each other, means conducting a coolant into said inner chamber, outwardly past said friction elements, and through said partition into said outer chamber, and means conducting said coolant from said outer chamber to the exterior of said hollow cylinder.

9. A brake comprising a stationary member and a rotary member, one of said members being in the form of a hollow cylinder having its axis coincident with the axis of rotation of said rotary member, the other of said members having a cylindrical portion coaxial with and extending through one end wall of said hollow cylinder in liquid-sealing engagement therewith, a cylindrical partition in said hollow cylinder dividing the interior thereof into inner and outer concentric chambers, axially slidable friction elements carried by said partition and by the cylindrical portion of said other member within said inner chamber, said friction elements being slidable into frictional engagement with each other and means conducting a coolant into said inner chamber, outwardly past said friction elements, and through said partition into said outer chamber, and means conducting said coolant from said outer chamber to the exterior of said hollow cylinder, the frictionally engaging faces of certain of said slidable friction elements being provided with a plurality of radial grooves whereby to conduct the coolant toward said outer chamber.

10. A brake comprising a stationary member and a rotary member, one of said members being in the form of a hollow cylinder having its axis coincident with the axis of rotation of said rotary member, the other of said members having a cylindrical portion coaxial with and extending through one end wall of said hollow cylinder in liquid-sealing engagement therewith, a cylindrical partition in said hollow cylinder dividing the interior thereof into inner and outer concentric chambers, axially slidable friction elements carried by said partition and by the cylindrical portion of said other member within said inner chamber, said friction elements being slidable into frictional engagement with each other, means conducting a coolant into said inner chamber, outwardly past said friction elements, through said partition into said outer chamber, and from said outer chamber to the exterior of said hollow cylinder, and means within said inner chamber for moving said slidable friction elements into friction engagement with each other and one of said frictional elements into frictional engagement with said one end wall of said hollow cylinder, the said one end wall being carried by said partition and axially adjustable thereon to provide for adjustment to compensate for wear of the friction elements.

11. A liquid-cooled brake including an annular disk-like friction element having a facing of friction material on at least one face thereof and radial, coolant-conducting grooves extending across said face, said grooves being of a depth greater than the thickness of said friction facing and extending a substantial distance into said annular friction element, whereby the bottoms of said grooves lie within the body portion of said annular friction element to directly cool said friction element.

12. A liquid-cooled brake including an integral rigid annular disk-like metallic friction element having inner and outer peripheral edges and radial friction faces, recesses extending through said inner peripheral edge and between said friction faces but terminating short of said outer peripheral edge, whereby to provide for circulation of the coolant adjacent said friction faces, the material of said element being exposed to the coolant throughout the entire inner surfaces of said recesses.

13. A brake as defined in claim 8, in which the hollow cylinder has another end wall, and the means for conducting coolant from the outer chamber to the exterior of the hollow cylinder comprises a channel member mounted upon the inner side of said other end wall.

14. A brake comprising a stator member and a rotor member, one of said members being movable into and out of frictional engagement with the other member, means providing an expansible pressure chamber having one end wall thereof constituted by a flexible diaphragm, a member of heat insulating material carried by said movable member and engaging said flexible diaphragm, whereby expansion of said pressure chamber will move said movable member into frictional engagement with said other member, and means for conducting a fluid under pressure into said expansible pressure chamber, said fluid conducting means comprising a tubular member attached to said flexible diaphragm.

HARLAND W. CARDWELL.
EARL R. JOHNSON.

REFERENCES CITED

The following references are of record in the file of this patent:

UNITED STATES PATENTS

| Number | Name | Date |
| --- | --- | --- |
| 2,017,715 | Goodyear et al. | Oct. 15, 1935 |
| 2,152,489 | Lamb | Mar. 28, 1939 |
| 2,174,635 | Linderman | Oct. 3, 1939 |
| 2,254,074 | Klaue | Aug. 26, 1941 |
| 2,262,709 | Lambert | Nov. 11, 1941 |
| 2,375,855 | Lambert | May 15, 1945 |
| 2,381,393 | Brown | Aug. 7, 1945 |
| 2,395,239 | White | Feb. 19, 1946 |

FOREIGN PATENTS

| Number | Country | Date |
| --- | --- | --- |
| 243,557 | Germany | May 13, 1910 |